United States Patent
Siegrist et al.

(10) Patent No.: US 12,394,040 B2
(45) Date of Patent: Aug. 19, 2025

(54) METHOD AND APPARATUS FOR THE DETECTION OF ANOMALIES IN TWO-DIMENSIONAL DIGITAL IMAGES OF PRODUCTS

(71) Applicant: Wipotec GmbH, Kaiserslautern (DE)

(72) Inventors: Michael Siegrist, Kaiserslautern (DE); Manuel Bastuck, Kaiserslautern (DE)

(73) Assignee: Wipotec GmbH, Kaiserslautern (DE)

( * ) Notice: Subject to any disclaimer, the term of this patent is extended or adjusted under 35 U.S.C. 154(b) by 345 days.

(21) Appl. No.: 18/132,372

(22) Filed: Apr. 8, 2023

(65) Prior Publication Data

US 2023/0334652 A1    Oct. 19, 2023

(30) Foreign Application Priority Data

Apr. 12, 2022   (DE) .................... 10 2022 108 979.7

(51) Int. Cl.
- G06K 9/00    (2022.01)
- G06T 7/00    (2017.01)
- G06T 7/11    (2017.01)

(52) U.S. Cl.
CPC .............. G06T 7/001 (2013.01); G06T 7/11 (2017.01); *G06T 2207/20076* (2013.01); *G06T 2207/20081* (2013.01); *G06T 2207/20161* (2013.01); *G06T 2207/30128* (2013.01)

(58) Field of Classification Search
CPC ......... G06T 2207/20076; G06T 7/0004; G06T 7/11; G06T 7/001
See application file for complete search history.

(56) References Cited

U.S. PATENT DOCUMENTS

| | | | |
|---|---|---|---|
| 7,844,100 B2* | 11/2010 | Auerbach | G06T 7/0004 382/150 |
| 2007/0098245 A1* | 5/2007 | Mylaraswamy | G06T 7/0004 382/199 |
| 2007/0282777 A1* | 12/2007 | Guralnik | G05B 23/0254 706/48 |
| 2008/0075353 A1* | 3/2008 | Tek | G01N 21/9501 382/145 |
| 2009/0271664 A1* | 10/2009 | Haas | G06F 11/008 714/48 |
| 2013/0085715 A1* | 4/2013 | Lakshminarayan | G06F 18/00 702/179 |
| 2019/0035077 A1* | 1/2019 | Kelley, Jr. | G16H 30/40 |

(Continued)

FOREIGN PATENT DOCUMENTS

WO    2021137745 A1    7/2021

*Primary Examiner* — Hadi Akhavannik
(74) *Attorney, Agent, or Firm* — Calvert Technology Law, PLLC; Nathan H. Calvert

(57) ABSTRACT

A method for detecting anomalies in digital images of products, wherein a region of a digital image is detected as a maximum anomaly if the value of a property of the region is greater than a predetermined maximum threshold, and/or wherein a region is detected as a minimum anomaly if the value of the property of the region is less than a predetermined minimum threshold. The maximum threshold value and/or the minimum threshold value are determined in a learning process using relatively few digital images based on a statistical distribution of the largest or smallest values of a specific quantity used for the detection of anomalies in digital images to be examined.

32 Claims, 10 Drawing Sheets

(56) References Cited

U.S. PATENT DOCUMENTS

2019/0087949 A1    3/2019  Woelk
2019/0342306 A1*  11/2019  Strauss ............... H04L 63/1416
2020/0067969 A1*   2/2020  Abbaszadeh ............ G06N 5/04

* cited by examiner

METHOD AND APPARATUS FOR THE DETECTION OF ANOMALIES IN TWO-DIMENSIONAL DIGITAL IMAGES OF PRODUCTS

TECHNICAL FIELD OF THE INVENTION

The invention relates to methods for detecting anomalies in digital images of products and to apparatuses and program products for carrying out the methods.

BACKGROUND OF THE INVENTION

In the manufacture of products, there is often the desire or the necessity to subsequently subject the manufactured products to an inspection to determine whether the product has any anomalies, in particular defects, foreign bodies or the like. For example, in the food industry, during the production of yoghurt or cheese, the task may arise of inspecting the finished product to determine whether there are any undesirable foreign bodies or other undesirable material areas within the product. To solve this problem, inspection devices are used in practice which irradiate the product with electromagnetic radiation, in particular with radiation in the X-ray spectrum. In this way, a digital image of the product is generated, which not only contains information about the external geometric dimensions or the surface of the product, but also about the interior of the product. Depending on their attenuation, anomalies to be detected can lead to image areas during transmission that have a higher or lower "grey value", i.e. pixel value, than the image areas that do not have any anomalies (hereinafter referred to as "areas"). In the present description, the term "grey value" is used for the information produced by the detector depending on the radiant power incident on the individual pixels or the corresponding radiant energy detected during the relevant exposure time, irrespective of the colour or manner in which the pixel values can be represented in the digital image concerned.

For such an inspection of products, devices or methods are also known in which the product to be inspected is not completely irradiated (complete irradiation normally requiring that the radiation source and the detector are located on opposite sides of the product), but in which the radiation penetrates deep enough into the product to be inspected and is "reflected" in the product, wherein this "reflection" is physically caused by a scattering of the radiation penetrating into a volume region or by generating a fluorescent radiation in the volume region. In such inspection devices, the radiation source and the detector can be located on the same side of the product to be inspected.

The product to be inspected can be in the form of a piece of material of any kind or also as bulk material, which is conveyed through the inspection device by means of a conveyor device.

In product lines where the products to be examined are moved along a conveyor path, line detectors are often used as detectors for the radiation. These line detectors have one or more detector lines, each with a predetermined number of pixels. The products to be inspected are moved through such a scanning device, usually at a constant speed, wherein a digital image is composed of a plurality of detected lines. However, it is of course also possible to use an area scanner instead of a line scanner. In this case, the digital image of the product to be examined can be captured by means of a single detection process (i.e. a single "exposure process").

Digital images generated by either a line scanner or area scanner are usually examined automatically to determine whether there are any anomalies within the product in question. The image generated directly by the scanning process can be processed or prepared before such an examination. For example, the original image can be digitally filtered, wherein the filter used for this can improve the contrast.

It is also possible to take measures to improve the contrast, especially with regard to the detection of anomalies, during the generation of the images. For example, a dual-energy method could be used, wherein the two spectra are selected in such a way that an improvement in contrast results from a superimposition of the respective partial images.

It is also possible to use spectrally resolving detectors that generate a plurality of images, each image being composed of pixels whose grey value corresponds to the radiant energy in a particular spectral section of the detected radiation. For the detection of anomalies, an image can then be used which is generated from all or selected partial images of such a spectrally resolving detector, for example by weighted addition of the respective pixel values. However, each sub-image can also be examined separately to determine whether an anomaly is present.

For the automated examination of the digital image of the product, methods are known in which a threshold value is determined, wherein an anomaly is present if the grey value of at least one pixel is greater than the threshold value. For this purpose, a predetermined number of good products (i.e. products that do not have an anomaly) of the same product type are usually scanned in a learning process in order to obtain information about the maximum grey values that usually occur in such good products. Depending on this, the threshold value is then set so that a predefined value for the false rejection rate (for example one percent or one per thousand) is ad-hered to. The false rejection rate is the probability with which a good product is recognised as a "bad product". This (theoretical) false rejection rate can be checked by determining the empirical frequency with which a good product is identified as a bad product. For this purpose, a sufficient number of digital images of good products can be generated and checked using the defined threshold value, wherein the empirical false rejection rate is determined as the quotient of the good products identified as bad products by the total number of good products.

The determination of such a threshold value thus requires an elaborate learning process in which a relatively high number of digital images of good products must be generated. However, this is disadvantageous because such a number of good products must first be generated using the relevant production line, i.e. production time is lost accordingly. In addition, it is hardly possible to predict how high the number of good products required for the learning process must be in order to reliably set the threshold value so that the desired false rejection rate is maintained.

SUMMARY OF THE INVENTION

It is an object of the invention to provide methods for detecting anomalies in digital images of scanned products, in which an automated process for setting a threshold used for detecting an anomaly can be performed quickly and reliably with a smaller number of digital images. Furthermore, other objects of the invention include providing apparatuses and computer program products for carrying out the process.

In accordance with aspects of the present invention, a threshold value for the detection of anomalies in digital images of products can be determined with good reliability in a learning process with relatively few digital images if an assumption is made about the statistical distribution of the largest or smallest values (hereinafter referred to as extreme values) of a specific quantity which is used for the detection of anomalies in digital images to be examined. For this purpose the assumption is made that the distribution of the extreme values can be described sufficiently well with a predetermined probability density function to be parameterised (in this description, the term "parameterising" refers to the determination or fixing of values for parameters of the probability density function). In other words, the assumption is made that the elements of the sample (i.e. the set of respective maxima or minima) satisfy the given probability density function or that their probability of occurrence is well described by this probability density function. Using the elements of the sample, estimated values are determined for all parameters to be determined (i.e. for all parameters of the probability density function that are not already predetermined). Probability density functions often have two parameters, in the case of normal distribution for example the expected value $\mu$ and the standard deviation $\sigma$ or the variance $\sigma^2$.

According to some embodiments of the invention, an extreme value distribution, in particular a predetermined variant of the generalised extreme value distribution, i.e. a Weibull distribution, a Fréchet distribution or a Gumbel distribution, is used to describe the distribution of the maximum or minimum values of the specific quantity. Of course, the generalised extreme value distribution itself with its three parameters can also be used.

The invention is not limited to the case explained at the beginning, in which the pixel values, in particular each individual pixel value, are used in conjunction with a threshold value for the pixel values to decide whether the digital image to be examined contains an anomaly. Rather, the invention generalises the principle underlying this approach. The image to be examined is divided into one or more regions, each region being assigned at least the same one property or the same multiple properties. Each region comprises either exactly one or several pixels, wherein several pixels are only assigned to the same region if they are adjacent (i.e. each pixel of the region has at least one immediately adjacent pixel of the same region). Each pixel that is adjacent to an edge of the pixel under consideration (i.e. the pixels at the top, bottom, left and right of the pixel under consideration), or (additionally) each pixel that is adjacent to a corner of a corner of the pixel under consideration (i.e. the pixels in the extension of the diagonals of the pixel under consideration) can be considered adjacent to a pixel under consideration. For each property of the previously defined regions, a value is determined that describes the respective property. If multiple properties are assigned to the regions, either separate values can be determined for each property or the values of two or more properties can be combined into a combined value, for example by an arithmetic operation (e.g. multiplication or division or weighted addition).

Detecting anomalies in this generalisation is done by setting a threshold for each property or for each combination of multiple properties.

In an extreme case, the entire image can be considered or defined as a region. If the pixel value of each pixel is examined as a specific quantity for the detection of anomalies to see whether the value exceeds or falls below a predefined threshold value for the pixel value, this leads to the same result as if each pixel is considered or defined as a region with exactly one pixel. In this case, the generalisation explained above using predefined regions and assigned ar-bitrary properties leads back to the previously usual method, according to which the individual pixels are examined with regard to their pixel values to see whether these exceed or fall below a threshold value for the pixel values.

The threshold value for a property or the threshold value for a combination of properties is determined in a learning process. The images required for determining the threshold value can be generated in advance in a sufficient, predetermined number or as required, i.e. one or more new digital images are successively generated until a sufficient number is reached. It should be noted at this point that the learning process can be carried out at any time and, in particular, does not have to be carried out before the (productive) commissioning of a corresponding device or system. In particular, the process can be carried out during the productive operation of a system, especially if good products or at least good process products are produced in the process (see below). In some embodiments of the invention, the learning process is carried out automatically. However, it is also possible to perform certain stages of the process, such as the generation of the digital images (this also includes a processing of originally detected digital images), completely manually or manually assisted.

According to some implementations within the scope of the invention, the learning process or the automated process for determining the threshold value for the at least one property is carried out using digital images of good products which do not exhibit any anomalies. As mentioned above, the images, which may be a direct result of a scanning process, can first be processed or prepared for the detection process. In the process, a suitable section of a determined overall image can also be generated, which comprises the product as a whole or predefined partial areas. The section generated in this way, or the entire captured digital image, can also be sub-jected to digital filtering, for example in order to improve contrast with the aim of emphasising anomalies even more. If an endlessly produced product or a bulk product is to be examined for anomalies, digital images of sections of such a product can be generated and these can be processed and examined in the same way as is possible with images of individual products (or sections of such products).

It should be mentioned at this point that it is not absolutely necessary to carry out the automated process exclusively with good products. Rather, the automated process can also be carried out with images of products as they are produced in a production line, without ensuring that none of the products represent a bad product. Instead of good products, products called "good process products" can be used, wherein a number of good process products comprise predominantly of good products and only to a smaller extent of bad products. In practice, it can be assumed that the proportion of bad products in a number of good process products is low, in particular less than 25%, preferably less than 10%, most preferably less than 5%.

Within the scope of the automated process, either a fixed number of digital images or a number of images of good products or good process products to be determined in the course of the automated process are generated or used.

For each of the digital images, the one or more regions are determined and for each region the value of the at least one property or the combined value for the multiple properties is determined. The maximum value of these values is determined as the maximum sample value of a maximum value sample and/or the minimum value of these values is determined as the minimum sample value of a minimum value sample.

Extreme values that are implausible or clearly indicate an error can be excluded. For example, when determining the extreme values, pixel values that have an absolute maximum value or an absolute minimum value of the grey scale used can be excluded, since a corresponding minimum value, for example a value of 0, can indicate a defective pixel of the detector and a maximum value can indicate an overdriven pixel of the detector.

The extreme values determined in this way represent the sample mentioned above and can be saved, for example in a list (if necessary, separately for the minimum and maximum values).

Subsequently, using the maximum sample values, estimated values are determined for all free, non-specified parameters of the probability density function specified for describing the maximum value sample and/or using the minimum sample values, estimated values are determined for all free, non-specified parameters of a probability density function specified for describing the minimum value sample. A statistical estimation method is used for this purpose.

Since a meaningful result of a statistical estimation method, especially using an estimator (also called a statistical estimator), can only be expected if the sample comprises a minimum number of values, one will usually specify such a minimum number, which in turn requires a corresponding minimum number of digital images.

An essential aspect of the invention is that a rate at which a maximum anomaly is falsely detected in images to be examined (when performing the method using the threshold), or a rate at which no maximum anomaly is correctly detected in images to be examined (when performing the method using the threshold), and/or a rate at which a minimum anomaly is falsely detected in images to be examined (when performing the method using the threshold), or a rate at which no minimum anomaly is correctly detected in images to be examined (when performing the method using the threshold) is predetermined. The maximum or minimum threshold value to be determined can thus be determined in such a way that the given rate is observed.

The term "rate" is understood to mean the quotient of the number of good products that fulfil the relevant rate criterion when the test is applied, and a given total number of good products or process products. The rate at which a maximum or minimum anomaly is falsely detected in images to be examined thus corresponds to the term "false rejection rate" often used in practice. The rate at which a maximum or minimum anomaly is incorrectly detected in images to be examined and the rate at which no maximum or minimum anomaly is correctly detected in an image to be examined add up to 1. During operation of a system, these rates can also be determined as a sliding value, e.g. via the number N of the last products checked.

If the predetermined probability density function is parameterised by means of the estimation method, the maximum threshold value can be determined using the previously parameterised probability density function or a distribution function corresponding thereto in such a way that the probability of the occurrence of a maximum value which is greater than or equal to the maximum threshold value corresponds to the relevant predetermined rate at which a maximum anomaly is falsely detected in images to be examined, or that the probability of the occurrence of a maximum value that is smaller than or equal to the maximum threshold value corresponds to the predetermined rate at which no maximum anomaly is correctly detected in an image to be examined. In other words, the maximum threshold can be determined such that the area under the probability density function above the maximum threshold or the area under the probability density function below the maximum threshold corresponds to the respective predetermined rate.

Similarly, the minimum threshold can be determined using the previously parameterised probability density function or a distribution function corresponding to it such that the probability of occurrence of a minimum value less than or equal to the minimum threshold corresponds to a predetermined rate, with which a minimum anomaly is falsely detected in images to be examined, or that the probability of occurrence of a minimum value greater than or equal to the minimum threshold corresponds to a predetermined rate with which no minimum anomaly is correctly detected in a good product. In other words, the minimum threshold can be determined such that the area under the relevant probability density function below the minimum threshold or the area under the probability density function above the minimum threshold corresponds to the relevant predetermined rate.

To determine the area, the integral over the probability density function can of course be used, wherein the integral is to be formed from the relevant threshold value up to an upper limit of the definition interval of the probability density function (e.g. infinity or a predetermined upper limit value above which the value of the integral, i.e. the area, changes only less than a predetermined error bound) or from a lower limit of the definition interval (e.g. minus infinity or a predetermined lower limit value below which the value of the integral, i.e. the area, only changes less than a predetermined error limit) to the threshold value.

Of course, instead of calculating the integral, as mentioned above, the distribution function of the relevant probability density function can be used, since the distribution function represents the value of the integral over the probability density function from minus infinity or the lower limit of the definition interval of the probability density function up to the relevant threshold value. The relevant area under the probability density function, i.e. the value of the integral or the value of the distribution function, thus corresponds to the (theoretical) probability with which a maximum or minimum value of a property of the regions of an image of a good product is less than or equal to the relevant threshold value. If the probability is to be calculated with which a maximum or minimum value is greater than or equal to the threshold value, then only the probability calculated in this way must be subtracted from 1.

Since the value of the area or the integral or the distribution function is specified for these calculations, the corresponding inverse function is used in these embodiments. These calculations can be done either analytically or by means of a numerical method. According to a further variant of the method according to the invention, the automated process can also be carried out by means of digital images of bad products. Each ("intentionally" generated) bad product contains at least one such anomaly as may actually occur in the type of product for which the method according to the invention is to be used for the detection of anomalies. The generated anomalies should cover a spectrum as it can occur in practice.

If it is known how such anomalies are created in the digital images to be examined, in particular which maximum or minimum values the properties of regions can assume which are to be recognised as anomalies, it is also possible to artificially generate digital images for carrying out the learning process, wherein corresponding anomalies can also be digitally superimposed on the images of good products. However, in order to arrive at sensible threshold values, sufficient knowledge of the anomalies occurring in practice is required.

As already indicated above, it is possible for a digital image of a bad product for the learning process to not only have a single anomaly, but several anomalies. In this case, it is suitable according to some embodiments to divide such a digital image into several images, each of which contains only a single anomaly. The division must be carried out with knowledge of the location information, i.e. the information as to which anomaly is present at which position on the surface or within the product and thus—taking into account the information as to how the image was taken (viewing angle, type of recording such as photography, transmission scan etc.)—at which position within the image which anomaly is present.

With the digital images of bad products generated in this way, each of which contains an anomaly, the learning process described above can then be carried out in an analogous manner, so that in the following only the relevant differences will be discussed.

Instead of using only bad products, it is also possible to use products that are predominantly bad products, i.e. to a lesser extent also good products. Such products are referred to below as bad process products. As explained below, both good products comprised by good process products and extreme values resulting from them and good products comprised by bad process products and extreme values resulting from them can be sorted out from the samples concerned using suitable methods.

Since the digital images in the case of bad products have maximum or minimum values of properties of regions caused by the anomalies, the associated probability density functions describe only the anomalies and not the good regions of the product. Thus, this information cannot be used to specify or achieve a false rejection rate. Instead, this information can be used to obtain a statement about when or under which conditions bad products are no longer falsely recognised as such.

If the learning process is carried out with bad products or process bad products, a rate is specified in each case at which a maximum or minimum anomaly is to be correctly detected in an image to be examined, or in each case a rate at which no maximum or minimum anomaly is to be incorrectly detected in images to be examined.

The determination of the maximum threshold value using the parameterised probability density function or a distribution function corresponding to it is then carried out in such a way that the probability of the occurrence of a maximum value that is smaller than or equal to the maximum threshold value corresponds to the specified rate, with which no maximum anomaly is incorrectly detected in an image to be examined, or that the probability of the occurrence of a maximum value that is greater than or equal to the maximum threshold value corresponds to the predetermined rate with which a maximum or minimum anomaly is correctly detected in an image to be examined.

If a minimum threshold is to be determined using the parameterised probability density function or a distribution function corresponding to it, this is done in an analogous manner so that the probability of the occurrence of a minimum value that is greater than or equal to the minimum threshold is equal to the specified rate that is encountered, with which no minimum anomaly is incorrectly detected in an image to be examined, or so that the probability of the occurrence of a minimum value which is smaller than or equal to the minimum threshold value cone-sponds to the respective predetermined rate with which a minimum anomaly is correctly detected in an image to be examined.

According to some embodiments of the invention, the estimates for the parameters of the predetermined probability density function can be determined by means of a statistical estimator (also referred to as an estimator), for example by means of the maximum likelihood method or the method of moments. It is also possible to "bin" the sample elements, i.e. assign each to adjacent intervals with a given width, and thus create an empirical frequency distribution. The selected probability density function to be parameterised can then be fitted to this frequency distribution. For example, the least squares method can be used for this. Usually, however, a more advantageous statistical estimation function is used for this, for example the maximum likelihood method or the method of moments.

The result is values for the parameters of the predefined probability density function. It should be mentioned here that in certain cases it is also possible to specify one or more values for certain parameters of the probability density function and to determine only the remaining "free" parameters in the manner described above.

According to further embodiments, the regions may be defined by means of a base threshold, wherein adjacent pixels whose pixel value is greater than (or equal to) the base threshold form a first group of regions, and adjacent pixels whose pixel value is less than the base threshold form a second group of regions. The first and second groups of regions can also be combined into a single group. Another way to define the regions is to use a predefined (geometric) mask. For example, a matrix-like mask can be used, which superimposes a e.g. square grid (i.e. a chessboard-like grid) over the digital image, where all pixels within a square form a region. Of course, the mask can also bring about other subdivisions, wherein the entire image does not have to be divided into regions.

In some embodiments of the invention, the regions are assigned a property that can be described by a value. This can be, in particular, geometric properties, such as the area, the circumference or the diameter of the regions (if these are at least approximately circular) or pixel value properties that are described by a value that results from the pixel values of the region concerned, such as, for example, the maximum or minimum value of a region, the average value or the variance of the pixel values.

Several properties can also be combined, which can then be described by a combined value. For example, the mean value and the standard deviation can be added, where this information represents a kind of confidence interval for the pixel values. The difference between the maxima and minima can also be used as a combined value that describes the brightness difference of the region. Since this measure is sensitive to outliers, quantiles can be used instead, for example the quantiles at 10% and 90% as an alternative to maxima and minima. Furthermore, the quotient of perimeter and area can be used to infer how circular the region is or how far it de-viates from circularity. However, geometric and pixel value properties can also be combined.

As already mentioned above, the number of elements of the sample, i.e. the number of extreme values (maximum or minimum grey values), may also not be fixed from the outset. In particular, the number of digital images of good products or good process products or bad products or bad process products can be determined using at least one termination criterion in the course of the learning process. For this purpose, the current number of digital images can be increased until the at least one termination criterion is fulfilled. In this case, the method described above, by which the relevant threshold value is determined, is carried out at each stage, i.e. after each increase in the number of digital images.

In a first step, it is of course possible to evaluate a minimum number of digital images in order to obtain a minimum number of elements of each sample of maximum and minimum grey values. This minimum number is chosen so large that the estimation function used can already produce reasonable estimates for the parameters of the probability density function in question with some probability.

According to some embodiments of the invention, the at least one termination criterion may be formed by or derived from a confidence interval for at least one parameter of the relevant probability density function. For determining the confidence interval, a confidence level, for example 95% or 99%, may be specified. If the confidence interval has a sufficiently small (predefined) total width for the predefined confidence level or a sufficiently small (predefined) distance from the estimated value to the upper or lower limit of the confidence interval, the termination criterion can be regarded as fulfilled. However, this variant will only be chosen if there is already experience of how a corresponding uncertainty of the parameter(s) of the probability density function in question affects the threshold value to be determined.

According to other embodiments, the at least one termination criterion is formed by a threshold confidence interval for the minimum threshold value or the maximum threshold value, wherein the threshold confidence interval is determined by determining a confidence interval for each parameter and determining the effect of these confidence intervals on the threshold confidence interval, in particular using the method of error propagation, in particular the Gaussian error propagation method. This has the advantage that the uncertainty for the threshold value is immediately recognisable. For the error propagation, the left and right limits of the confidence interval for the relevant parameter are determined and from this the difference between the estimated value and the relevant limit. These differences can then be used for error propagation.

It is also possible to use a threshold value confidence interval for the minimum threshold value or maximum threshold value as the at least one termination criterion, wherein the threshold value confidence interval is determined by means of a statistical method, in particular using the bootstrapping method. In doing so, a large number of further samples are generated from the respective existing sample of maximum or minimum grey values, which usually have the same size, and which are generated from the existing sample in each case by renewed "drawing with reclosing" (with the same selection probability). With these samples generated in this way, the threshold value is calculated again using the relevant estimation function. This leads to a distribution of threshold values in an interval, wherein this distribution is used to determine the confidence interval.

Similarly, a confidence interval can be specified for the given rate(s) in question.

In general, if both minimum and maximum threshold values are to be determined in one and the same learning process, a termination only occurs when both termination criteria are fulfilled.

According to further embodiments, using the respective parameterised probability density function and the respective parameters, for each detected maximum sample value or minimum sample value, the probability of values occurring that are less than or equal to the respective detected maximum sample value or minimum sample value and the probability of values occurring that are greater than or equal to the respective detected maximum sample value or minimum sample value are determined. The parameters for the probability density function are redetermined using these results if, for at least one of the detected maximum sample values or minimum sample values, one of the two respective probabilities determined in this way is smaller than a predetermined outlier limit, wherein these maximum sample values or minimum sample values are not taken into account in the redetermination.

In this way, an outlier detection is realised in which such elements of the sample (i.e. such extreme values) are not taken into account in the determination of the probability density function whose probability of occurrence is extremely low. This makes it possible, in particular, to use methods according to the invention even if it is not ensured that the learning process is carried out exclusively with good products or exclusively with bad products. For example, a learning phase can be carried out during the start-up of a production line (or also during ongoing production), in which the products produced or fed to the system are used to determine (or redetermine) the respective threshold value. If there is a bad product among these products (i.e. they are good process products), the relevant maximum or minimum grey value, which then characterises a bad product, can be excluded.

This method can also be carried out recursively, as the exclusion of samples results in a new, modified parameterised probability density function, which then also leads to modified occurrence probabilities with regard to the sample values still used. The maximum number of recur-sions can of course be limited. Likewise, this outlier detection can only be used when the sample in question comprises a minimum number of values.

It should be mentioned at this point that the probabilities of occurrence can of course be determined again by means of the associated distribution function without requiring a new calculation process for the integration of the probability density function in each case.

According to further embodiments of the invention, a statistical test can be performed which provides a statement as to whether the respective predetermined probability density function describes the empirical distribution in the form of the respective detected maximum and/or minimum grey values sufficiently accurately using the estimated values for the parameters determined for this purpose. Examples of possible statistical tests are the chi-square adjustment test, the Kol-mogorov-Smirnov adjustment test, the Anderson-Darling adjustment test, the Jarque-Bera adjustment test or the Lilliefors adjustment test.

This ensures that a sufficient number of sample elements are used for the estimation of the parameters of the probability density function, which also characterise the probability density function sufficiently precisely or whether the selected type of probability density function is suitable for characterising the empirical distribution density of the sample in question.

The estimation of the parameters can be carried out—preferably after detecting a predetermined minimum number of maximum sample values or minimum sample values—for a plurality of predetermined different probability density functions, wherein the statistical test is carried out for each of the probability density functions parameterised in this way and wherein for the further method that probability density function is used as the predetermined probability density function for which the statistical test provides the most appropriate result. In this way, the type that proves to be most suitable, depending on the character or quality (in particular the geometry and material of the products to be examined and the anomalies that occur), can be selected from a predetermined number of types of probability density functions in the learning process.

According to some embodiments of the invention, a confidence interval and/or at least one error limit for the respective predetermined rate can be determined from the limits of the confidence interval for the maximum threshold value and/or the minimum threshold value. This can of course again be done by integrating the probability density function or using the associated distribution function.

The values determined in this way can then be output after completion of the learning process, i.e. when the process is carried out with the correspondingly determined threshold value, for the monitoring and/or control of devices or an entire product line that serves to manufacture, process or check the products. For example, the current rate can be monitored and/or shown on a display, for example also depending on the production time. In particular, the upper error limit in the case of the specified rates with which a maximum or minimum anomaly is to be incorrectly detected in an image to be examined, or the lower error limit in the case of the specified rates with which a minimum or maximum anomaly is to be correctly detected in an image to be examined, is decisive.

It is also possible to output the maximum threshold and/or the minimum threshold for monitoring and/or controlling devices or an entire production line used to manufacture, process or inspect the scanned products. In particular, the power of a radiation source of an inspection device with which the digital images are generated (for example, an X-ray radiation source) could be reduced until the desired (low) predetermined rate can still be achieved.

According to further embodiments of the invention, a secondary maximum threshold value can be determined on the basis of the determined maximum threshold value, wherein the secondary maximum threshold value is selected within the limits of a confidence interval determined for the maximum threshold value or equal to a limit of this confidence interval. Similarly, a secondary minimum threshold value can be determined on the basis of the determined minimum threshold value, the secondary minimum threshold value being selected within the limits of a confidence interval determined for the minimum threshold value or equal to a limit of this confidence interval. In this way, the detection of maximum or minimum anomalies can be optimised either in the direction of an improved (reduced) false rejection rate or in the direction of an improved sensitivity of the detection of anomalies. The reduction of the false rejection rate by setting the secondary maximum threshold value to the upper limit of the confidence interval for the maximum threshold value or setting the secondary minimum threshold value to the lower limit of the confidence interval for the minimum threshold value can be regarded as most relevant in practice.

The apparatuses according to the invention for carrying out the above-described methods according to the invention comprise a data processing device which is adapted to obtain digital image data representing the digital images of products to be examined for anomalies. The entire device can be, for example, a device for generating the digital images, for example an inspection device, which can be designed as an X-ray inspection device, in which information about the interior of a product is also generated in the form of a digital image, or as an inspection device with one or more cameras, with which a 2D or 3D image of a product is generated.

A data processing device suitable for a device according to the invention may commonly comprise a processor with suitable input and output interfaces. The processor can, for example, be designed as a special processor for industrial image processing. Of course, the processor can also be realised by a combination of a common processor with a special image processor. The entire data processing device can also be realised as an independent CPU unit with corresponding interfaces, for example also as a slot CPU.

These and other aspects, advantages, and features of the invention will be apparent from the following description of representative embodiments, considered along with the accompanying drawings.

DESCRIPTION OF REPRESENTATIVE EMBODIMENTS

Figure 1:
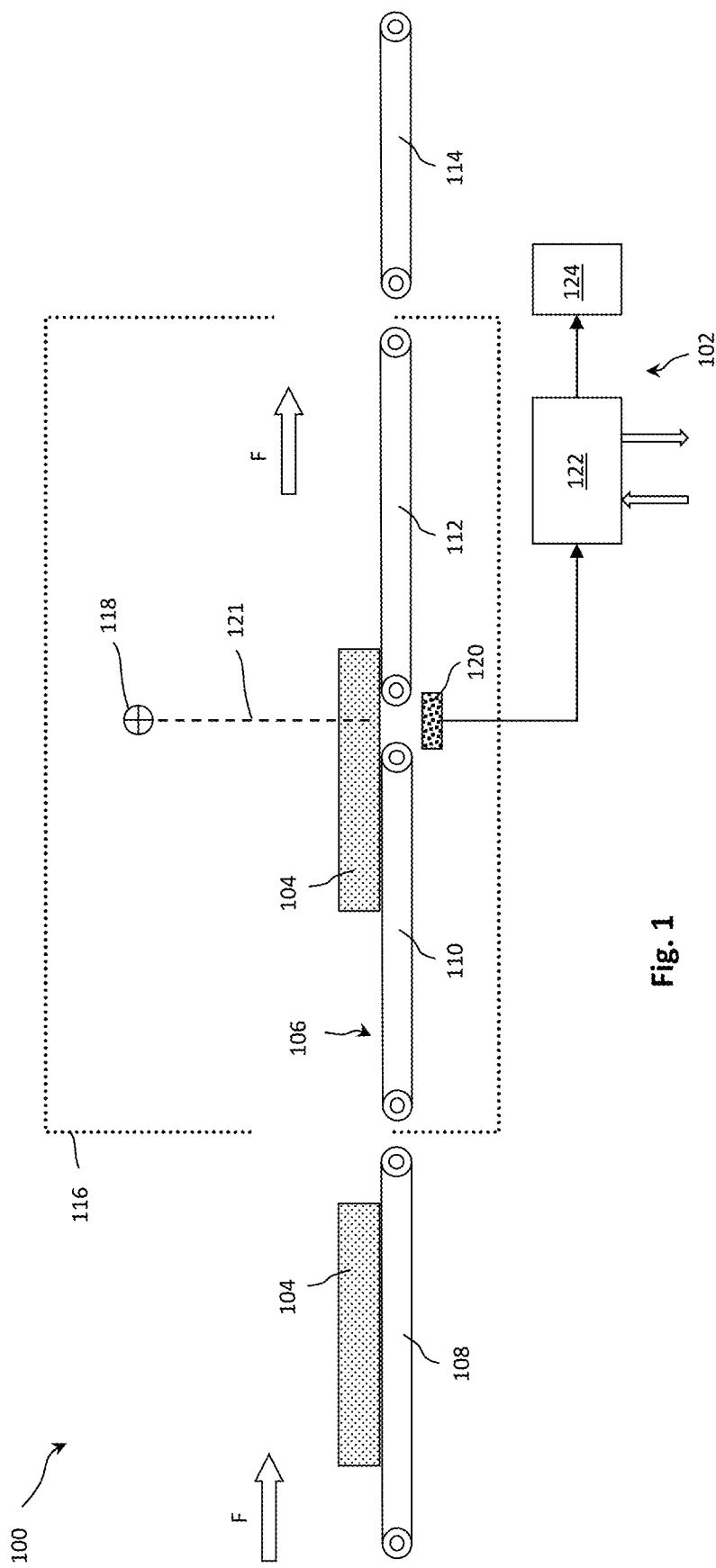
FIG. 1 is a schematic representation of an X-ray inspection apparatus with a device for carrying out methods according to the invention.

FIG. 1 schematically shows an X-ray inspection device 100 with a device 102 for detecting anomalies in digital images, which is designed to perform the example method described below. The X-ray inspection device 100 is only one possible example of how digital images that may contain anomalies can be generated. It is possible to apply methods according to the invention to any digital images that are to be examined for the presence of anomalies.

As stated above, the digital images will typically represent products which in turn may have the anomalies to be detected. In the case of the X-ray inspection device shown in FIG. 1, products 104 in the form of piece goods are examined as an example. However, it is also possible to generate digital images of any other products, for example bulk products. In this case, it is possible to generate digital images, each of which represents a section of the bulk product.

In the X-ray inspection device 100 shown in FIG. 1, the products 104 to be inspected are transported along a predetermined conveying path (indicated by the arrow F) by means of a conveyor 106. The conveyor 106 has several conveyor belts 108, 110, 112, 114. The conveyor belt is used to feed the products 104 and the conveyor belt 114 is used to discharge the products. The inspection device 100 comprises a shielding housing 116 in which the conveyor belts 110 and 112 are arranged, an X-ray radiation source 118 and an X-ray radiation detector 120. The X-ray radiation source 118 generates an X-ray beam 121 which has a fan-like shape perpendicular to the drawing plane and a small width in the conveying direction. The X-ray beam 121 passes through a gap or free space between the facing ends of the conveyor belts 110 and 112 and then strikes the X-ray detector 120, which in the embodiment of the X-ray inspection apparatus 100 shown in FIG. 1 is arranged below the conveyor belts 110, 112. The X-ray detector 120 has a width which, in the direction perpendicular to the drawing plane, corresponds to the maximum width of the products to be inspected. Usually, the width of the X-ray detector is chosen to be approximately as large as the width of the conveyor belts 110, 112. The X-ray detector 120 can be designed as a line detector, which has one or more detector lines in the direction perpendicular to the drawing plane, each detector line having a predetermined number of pixels.

The anomaly detection device 102 comprises an image processing unit 122 to which the signal from the X-ray detector 120 is fed. The image processing unit 122 can be designed as a conventional computer unit with one or more processors, a main memory and, if necessary, a hard disk memory or SSD memory as well as suitable interfaces for feeding the signal of the X-ray detector 120 and for feeding or receiving and sending or receiving further data. Furthermore, the device 102 may have a display unit 124 on which information generated by or fed to the image processing unit 122 can be displayed.

As shown schematically in FIG. 1, the products 104 to be examined are moved through the fan-like X-ray beam 121, whereby a corresponding digital image signal is generated by means of the X-ray detector 120, which is designed as a line detector, and is fed to the image processing unit 122. The image processing unit 122 can be designed in such a way that a digital image is first generated from the image signal, which, in the case of piece goods, contains the complete product 104 or at least a predefined section. The section can be selected using conventional methods of image processing or pattern recognition. From the digital image generated in this way, the image processing unit 122 can also subject the final digital image, which is to be examined for the presence of anomalies using the method described below, to further image processing, for example digital filtering, which is selected in such a way that anomalies to be detected are better recognisable, in particular stand out better compared to the remaining image. Such image pre-processing can also include any other image processing steps, for example noise reduction or the like. At the end of such an image pre-processing (which is not absolutely necessary) is the digital image, which is then to be examined for the presence of anomalies.

As explained at the beginning, for detecting anomalies it is known to use a threshold value for the pixel values. In this case, the presence of an anomaly is detected when a pixel value or a group of neighbouring pixels with a predetermined minimum number of pixels exceeds a threshold value. If one or more anomalies are detected in a digital image, this information can be used to trigger an action in relation to the associated product, for example to reject the product from a stream of products. Instead or in addition, the product in question can also be marked physically or virtually, i.e. by assigning corresponding data.

The display unit 124 can be used to display desired information, such as the digital images to be examined with any anomalies detected therein, the threshold value used in each case, the type of probability density function selected and the associated parameters, the quality of the fit of the probability density function to the sample, confidence intervals for the threshold values, the parameters or the rates (in particular the false rejection rate) and the like. The output can of course be in the form of data (numerical values) and/or graphics. When performing the detection in the normal working mode of the device, a graph identical or similar to FIGS. 6 to 7 can also be displayed, in particular the course of the current ejection rate during the (normal) working mode of the device 102 (but also during the learning process) over time, wherein the predetermined rate (e.g. the false ejection rate) and the confidence interval for the predetermined rate are also displayed. Furthermore, a list with the sample values and/or a graph similar to FIG. 2 can be displayed. Of course, the relevant data can also be output to a higher-level unit and/or stored.

The image processing unit 122 may also be supplied with one or more starting threshold values already determined by the method described below for a type of product currently being examined, or with further information necessary for carrying out the method described below, for example information concerning the type of predetermined probability density function(s) to be used or information concerning the manner in which regions are defined in a digital image to be examined (see below).

As explained above, the method described below for detecting anomalies in digital images is not limited to checking whether one or more pixel values exceed a predetermined maximum threshold value or fall below a predetermined minimum threshold value. Rather, the method described below for determining a maximum threshold value or minimum threshold value can be generalised to the effect that a maximum threshold value and/or a minimum threshold value is determined for any properties of previously defined regions in the digital images to be examined.

For this purpose, the regions to which the value of a given property can be assigned must first be defined in a digital image to be examined. The regions can be defined, for example, by using a threshold value, wherein all pixel values that are equal to or exceed the threshold value form a first group of regions and the remaining pixel values form a second group of regions. Depending on the property to be investigated, it may be sufficient that only the first or only the second group is processed. This is the case, for example, if only the maximum or minimum pixel value or the average pixel value of the regions is evaluated for the detection of an anomaly.

However, it is possible to assign one or more properties to the regions that cannot only be described by individual pixel values. For example, geometric properties such as area, circumference, diameter (in the case of at least approximately circular regions) or the deviation from the circular shape can be assigned to a region. In such a case, an anomaly is detected when the value of the property in question exceeds a maximum threshold value predefined for this purpose or falls below a predefined minimum threshold value. In this general case, too, the minimum and maximum threshold values required for this can be determined using the method explained below.

Another way of determining the regions in a digital image to be examined is to use a predefined geometric mask that is placed over the image. This can be, for example, a mask comprising equally sized neighbouring squares of a given size.

Here, too, one or more properties can be assigned to each region defined in this way, for example the variance or standard deviation of the pixel values encompassed by the regions, the relevant average value or the maximum or minimum value contained therein.

Combined values for each region can also be determined from two or more values for different properties. For example, a value for the variance or standard deviation of the pixel values and an average value can be combined into a combined value, especially by an arithmetic operation, e.g. (weighted) addition, which in this particular case represents a kind of confidence interval if the pixel values in this region are reasonably normally distributed. Another example of a combined value or combination of properties of the regions is the use of a difference between the maximum and minimum pixel value contained in each. To be more stable against outliers, quantiles can also be used, for example 90% and 10% quantiles instead of the maximum and minimum value.

In the following, it is described how a corresponding maximum threshold value or minimum threshold value can be determined with a small number of digital images. As mentioned above, such a learning process can be carried out with good products or good process products as well as with bad products or bad process products. The learning process can be carried out, for example, during the commissioning of a plant for the production or processing of products, which comprises such an inspection device. It will generally be necessary to determine the threshold values for each product type.

Of course, the threshold values for specific product types can be saved so that the learning process does not have to be repeated every time a change is made to the type of product being tested.

It is also possible to carry out the learning process during the ongoing operation of a plant, at least if it can be assumed that the plant produces good process products, i.e. products that are predominantly good products (which do not contain an anomaly). In this case, as explained below, the bad products contained in the good process products can be sorted out as outliers when creating the required sample.

An essential feature of the method for determining the threshold values according to the invention described below is that, in the case of using good products, a rate is specified at which a maximum anomaly is to be falsely detected in an image to be examined (hereinafter also referred to as the false positive rate) or at which no maximum anomaly is correctly detected in an image to be examined (hereinafter also referred to as the correct negative rate) and/or that, in the case of using bad products, a rate is specified, with which a maximum anomaly is correctly detected in an image to be examined (hereinafter also referred to as the true-positive rate) or with which no maximum anomaly is incorrectly detected in an image to be examined (hereinafter also referred to as the false-negative rate). Thus, it is no longer necessary to determine a threshold value in a first step and to check in a second step whether a corresponding acceptable rate results when using the threshold value in question.

The methods according to the invention ensure that a threshold value can be determined with a relatively small number of digital images.

The required number of digital images, i.e. the number of good products or good process products, can be determined from the outset, although such a number must then be chosen high enough to determine a threshold value with the desired reliability. However, it is also possible to determine the required number of digital images in the course of the learning process (regardless of whether the images are generated during the learning process or are already available before the start of the learning process). It is a good idea to start with a minimum number of digital images and to increase this minimum number step by step by one or more digital images until the respective threshold value is sufficiently reliable, i.e. the specified rate is maintained with sufficient reliability. This can be checked by determining a confidence interval.

In a next step, as with the detection of anomalies in a normal operating mode (i.e. outside the learning process), the regions are determined for each of the digital images and the value of at least one property respectively assigned to the regions is determined for each region. For each digital image, the maximum value and/or the minimum value of the property or properties in question, or the combined value for several properties, is then determined and assigned to a corresponding sample. This can be done, for example, by storing all minimum values in a minimum value list and all maximum values in a maximum value list. It should be mentioned that of course not both alternatives of the method have to be used at the same time. If only maximum anomalies are to be detected in normal operation, i.e. anomalies that are recognised as such when a maximum threshold value is exceeded, then of course only a maximum threshold value must be determined. The same applies if only minimum anomalies are to be detected.

If a sufficient number of sample elements (maximum or minimum values for the at least one property or combined property) has been determined, a probability density function specified for the maximum value list or minimum value list can be parameterised in a further step using a statistical estimation method. This corresponds to fitting the probability density function to the empirical frequency distribution of the sample in question.

For this purpose, the sample can be binned, i.e. the sample elements are each assigned to equally wide, neighbouring intervals of the associated value range. The relevant predetermined probability density function can then be fitted to this empirical (relative) frequency distribution, for example by using the least squares method. Usually, however, a more advantageous statistical estimation function is used, for example the maximum likelihood method or the method of moments.

The probability density function specified for carrying out the method should be of a type that can be assumed to describe the sample well when the parameterisation is carried out. Since in the present case extreme values are selected for the property in question and form the respective sample, one will often choose a type of the generalised extreme value distribution or the generalised extreme value distribution (with its three parameters), which combines the Gumbel distribution, the Weibull distribution and the Fréchet distribution. The frequently used Gumbel distribution has the form:

$$f(x) = \exp\left[-\exp\left(-\frac{x-\mu}{\beta}\right)\right]$$

Here f denotes the value of the probability density as a function of the random variable x. In this case, the value x of the respective random variable denotes the value of the property in question or the combined value. The parameters $\mu$ and $\beta$ are determined by the chosen statistical method.

Figure 2:
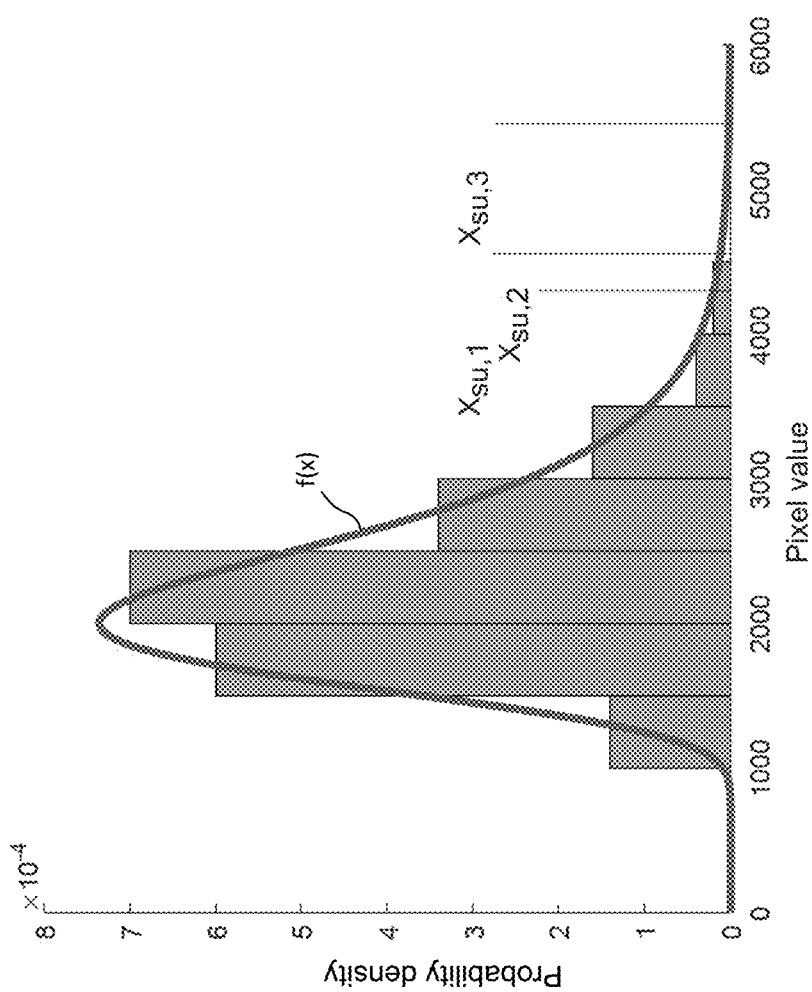
FIG. 2 is a graph showing the empirical frequency distribution of a sample of maximum values of a property of previously determined regions in digital images of good products, and a probability density function fitted to it.

FIG. 2 shows a graph schematically illustrating the fitting of a probability density function f(x) to a relative empirical frequency distribution of maximum pixel values, where x is the pixel value. The pixel values are plotted on the abscissa and the values for the probability density, or the relative frequency are plotted on the ordinate.

With the probability density function parameterised in this way, the desired threshold value (for the specified rate at which a maximum anomaly is falsely detected in images to be examined or at which no maximum anomaly is correctly detected in images to be examined) can be determined in a further step. For this purpose, the threshold value is set in such a way that the area under the parameterised probability density function above the threshold value is equal to the specified rate at which a maximum anomaly is falsely detected in images to be examined, or the area under the parameterised probability density function below the threshold value is equal to the specified rate at which no maximum anomaly is correctly detected in images to be examined. This is because this area corresponds to the probability of the occurrence of a maximum value of the property in question in a digital image that is greater than or equal to the threshold value. The threshold value can be obtained by rearranging the equation from the inverse function of the distribution function associated with the parameterising probability density function, if a closed-form solution for the inverse function exists. Otherwise, the threshold value can be calculated using known and suitable numerical methods.

In FIG. 2, threshold values $X_{so.1}$, $X_{so.2}$ and $X_{so.3}$ are drawn corresponding to a false positive rate of 1.0%, 0.6% and 0.1%, i.e. the areas under the probability density function to the right of these threshold values give the values 0.01, 0.006 and 0.001, respectively.

If the correct negative rate is specified instead of the desired false positive rate, the area under the probability density function below the upper threshold value $X_{so}$ must be used accordingly for the calculation of the maximum threshold value.

Figure 3:
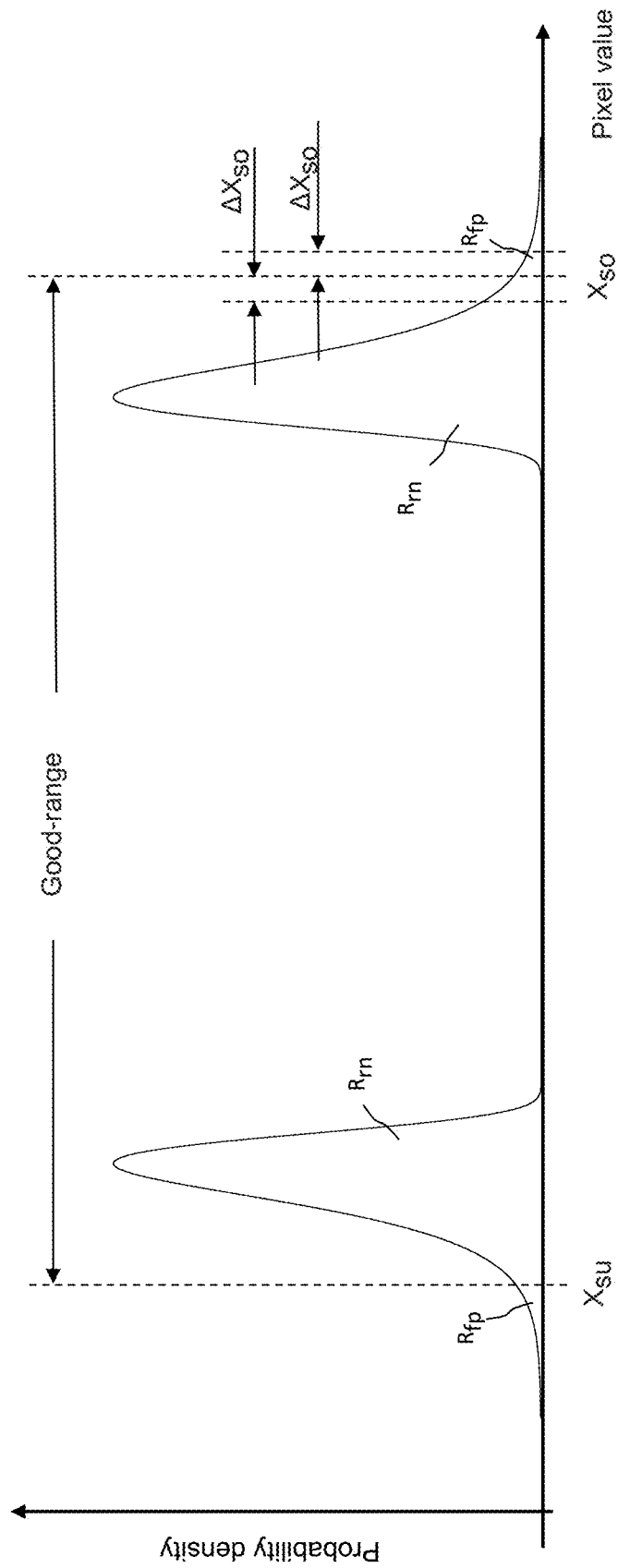
FIG. 3 is a graph showing a probability density function for each of the minimum and maximum values of a property determined using digital images of good products (or good process products).

FIG. 3 shows a similar graph as in FIG. 2, but only the course of the already fitted probability density function is shown. In this example, both a maximum threshold value $X_{so}$ and a minimum threshold value $X_{su}$ are determined using the parameterised probability density function. Here, in both cases, i.e. for the determination of the maximum threshold value as well as for the determination of the minimum threshold value, the same false positive rate $R_{fp}$ is specified, wherein for the determination of the minimum threshold value $X_{su}$ the false positive rate $R_{fp}$ is equal to the area under the probability density function below the minimum threshold value $X_{so}$. Correspondingly, the true-negative rate $R_m$ is equal to the area under the probability density function above the minimum threshold $X_{su}$. This is because a minimum anomaly is detected when the value of the property in question or the combined value for several properties is smaller than the relevant minimum threshold value $X_{su}$.

In the case of the parameterised probability density functions according to FIG. 3, a digital image would be detected as containing an anomaly if, for at least one region, a value of the property under consideration or a combined value for the properties in question is found to lie outside the good range between the minimum threshold and the maximum threshold (or in other words, if the value in question is less than or equal to the minimum threshold $X_{su}$ or greater than or equal to the maximum threshold $X_{su}$).

Furthermore, FIG. 3 shows a confidence interval for the maximum threshold value $X_{so}$, wherein a symmetrical confidence interval with the limits $X_{so}-\Delta X_{so}$ and $X_{so}+\Delta X_{so}$ was assumed here for the sake of simplicity. In order to reduce the false rejection rate to the desired predefined value with even higher certainty, a secondary maximum threshold value can be used for the detection of anomalies, which is greater by $\Delta X_{so}$ than the determined threshold value $X_{so}$. Similarly, a secondary minimum threshold value can be used that is smaller than the determined threshold value $X_{su}$ by the width of a confidence interval $\Delta X_{su}$ for the lower threshold value $X_{su}$. In other words, the secondary maximum threshold value corresponds to the upper limit of the confidence interval for the maximum threshold value and the secondary minimum threshold value corresponds to the lower limit of the confidence interval for the minimum threshold value.

Figure 4:
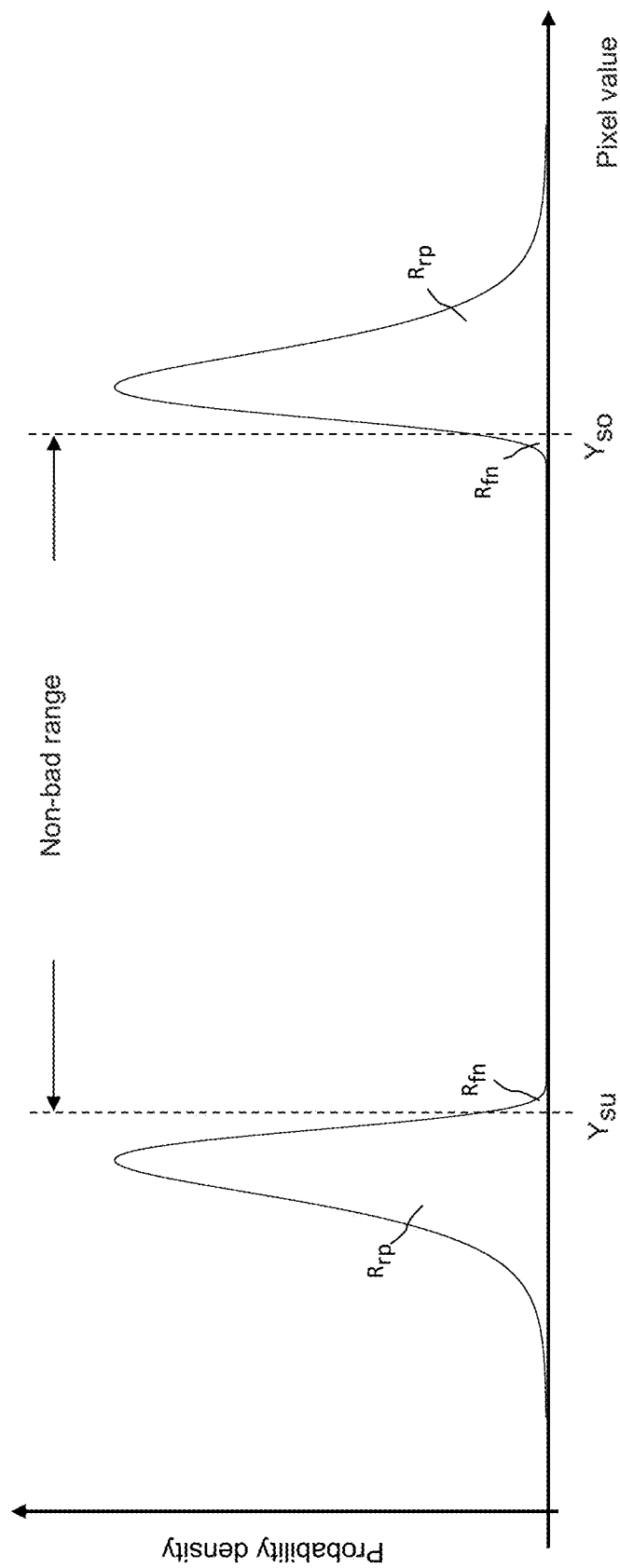
FIG. 4 is a graph showing a probability density function for each of the minimum and maximum values of a property determined using digital images of bad products (or bad process products).

FIG. 4 shows a graph similar to the graph in FIG. 3, wherein in the relevant embodiment bad products are used to determine one or both threshold values $X_{su}$ and $X_{so}$. However, in this case, the information used in the anomalies of the bad products is used in the method to determine the threshold. Instead of a false positive rate, a true positive rate for a false negative rate is specified here, as explained above.

In this case, the two threshold values are designated as $Y_{su}$ and $Y_{so}$ for differentiation. The minimum threshold value $Y_{su}$ must be chosen so that the area under the probability density function above the minimum threshold value $Y_{su}$ corresponds to the desired false negative rate (or the area under the probability density function below the minimum threshold value $Y_{su}$ corresponds to the desired true positive rate). Similarly, the maximum threshold value $Y_{so}$ must be chosen so that the area under the probability density function below the maximum threshold value $Y_{so}$ corresponds to the desired false negative rate (or the area under the probability density function above the maximum threshold value $Y_{so}$ corresponds to the desired true positive rate). Accordingly, pursuant to the graph in FIG. 4, there is a non-bad range between the two threshold values $Y_{su}$ and $Y_{so}$.

As stated above, the number of digital images for determining the threshold value(s) (maximum or minimum threshold value) can be fixed. This number would be chosen large enough to determine a sufficiently reliable threshold value.

However, according to further embodiments, the number of digital images required can also be determined during the learning process. For this purpose, at least one termination criterion is defined. Starting from a predetermined minimum number of digital images, a loop of the learning process is run through until the at least one termination criterion is fulfilled. After each loop, the number of digital images can be increased by one or more images. The loop is executed until the termination criterion is fulfilled or a predefined maximum number of digital images is reached.

As a termination criterion, for example, a confidence interval can be defined for one or more of the parameters of the probability density function that are determined during parameterisation. For a meaningful application of this possibility, however, it would be a prerequisite that sufficient experience is available as to how errors or uncertainties of these parameters affect the threshold value to be determined.

It is more advantageous to determine a confidence interval for the threshold value in question. For this purpose, a confidence interval can be determined for each parameter and then the effect of this uncertainty on the threshold value. For this purpose, the effect of the error in the determination of the parameters (using the upper and lower limits of the confidence interval for the threshold values) on the calculation of the threshold value concerned can be determined, for example, by means of a method for determining error propagations, for example the method of Gaussian error propagation.

Instead of an error propagation method, another suitable statistical method can be used to determine a confidence interval for the threshold value in question or also to determine a confidence interval for the given rate. An example of this is the bootstrapping method. However, since these are well-known mathematical methods, they will not be described in more detail.

It has already been mentioned above that when using good process products for creating the required digital images, it is advantageous if those images that are based on bad products contained in the good process products, i.e. represent bad products, are not taken into account when determining the threshold value(s). This can be done by examining the extreme values of a sample for their probability of occurrence. For this purpose, the parameterised probability density function—initially using all extreme values of a sample—can be used, wherein for each sample value of the sample concerned, the probability is determined with which values occur that are smaller than or equal to the detected sample value concerned along with the probability with which values occur that are greater than or equal to the detected sample value concerned. If one of the probabilities determined for a sample value in this way is smaller than a predefined outlier limit, this sample value is recognised as an outlier.

Subsequently, a new parameterisation of the probability density function in question can be carried out, wherein sample values detected as outliers are not taken into account (e.g. deleted from the list in question).

This method can also be carried out iteratively, wherein the number of passes can be limited to a maximum number.

The same applies, of course, when using bad process products to determine the threshold value(s). However, in practice this method will play a minor role, as bad products are usually produced on purpose, and it is therefore unlikely that there is a good product among the bad products that should be sorted out as an outlier.

Finally, a statistical test can be carried out which provides a statement on how well the given (parameterised) probability density function describes the empirical distribution of the sample value in question. Examples of possible statistical tests are the Chi-square adjustment test, the Kolmogorov-Smirnov adjustment test, the Anderson-Darling adjustment test, the Jarque-Bera adjustment test or the Lilliefors adjustment test. If the test does not provide a satisfactory result for the parameterised probability density function determined in each case, i.e. if a value describing the quality of the test lies outside a specified permissibility range, an error message can be generated.

It is also possible to specify several (different types of) probability density functions and perform the statistical test with two or more specified and parameterised probability density functions. The probability density function for which the statistical test gives the best result can then be used to determine the final threshold value.

Figure 5:
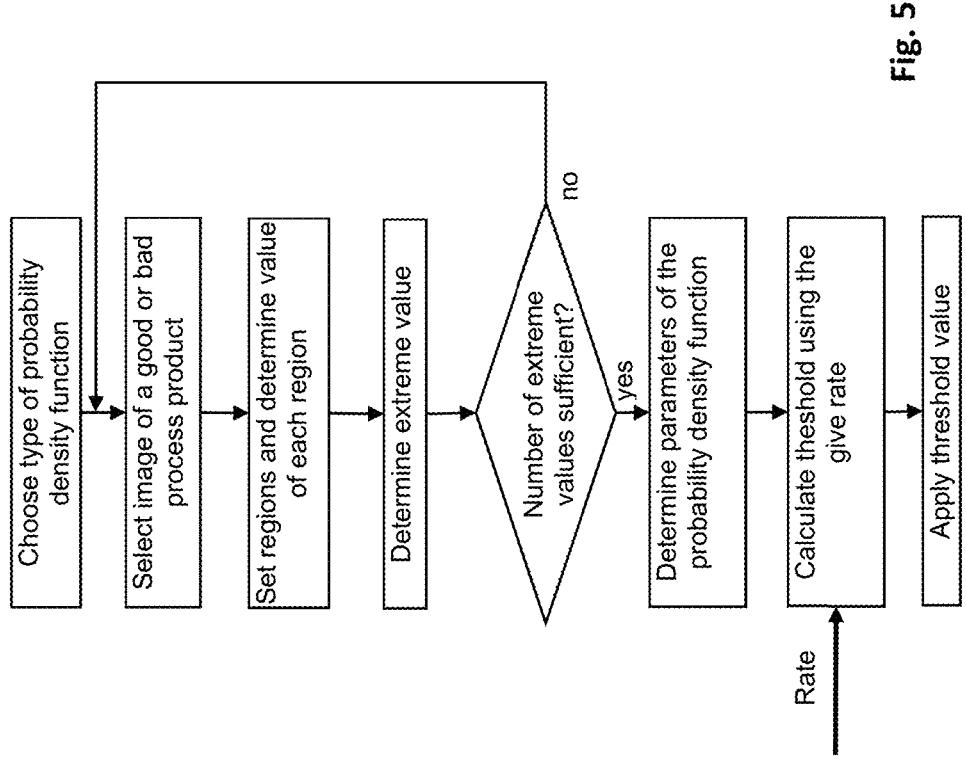
FIG. 5 is a simplified flowchart explaining the method for determining the threshold value.

The basic method for determining the threshold value is briefly explained again below using the simplified flow chart shown in FIG. 5. In a first step, the type of probability density function, for example a certain type of generalised extreme value distribution, is selected. In the next step, a first image of a good or bad process product is selected. This image can also be generated first in the relevant step, i.e. captured and processed if necessary. Subsequently, in a further step, the regions are determined according to previously presented specifications and, for each region, the value of the relevant property of the region is determined, for example the maximum pixel value within each region. Subsequently, the desired extreme value or values (maximum and/or minimum) of these values of the property of the regions are determined.

Then it is checked whether the number of extreme values determined in this way (per type, i.e. minimum or maximum value), which corresponds to the number of digital images, is sufficient. For example, this test can be done to see if a given minimum number of maximum values has been reached.

Then, in a further step, the parameters of the probability density function are determined in one of the ways described above. From the probability density function parameterised in this way or the associated distribution function, the relevant threshold value (for the maximum and/or minimum values) can then be determined in the prescribed manner, using a predetermined rate for this purpose, for example a false ejection rate. The threshold value is thus determined in such a way that the predetermined rate, for example the false ejection rate, is observed when applying the method for detecting anomalies using the threshold value to be determined.

Once it has been determined, the threshold value can be applied when carrying out the method. Of course, it can also be stored, output or used in any other way.

After the step of determining the parameters of the probability density function, a test can also be made, as explained above, as to whether the quality of the fit of the probability density function to the sample of extreme or maximum values is sufficient. If not, the number of maximum values (of the digital images) can be increased and/or another type of probability density function can be chosen.

Furthermore, in the step of determining the threshold value (or subsequently), a confidence interval for the threshold value can be determined in the prescribed manner and tested regarding whether the width of the confidence interval is sufficiently small. If not, the number of sample values (maximum values or extreme value) can be increased further.

Figure 6:
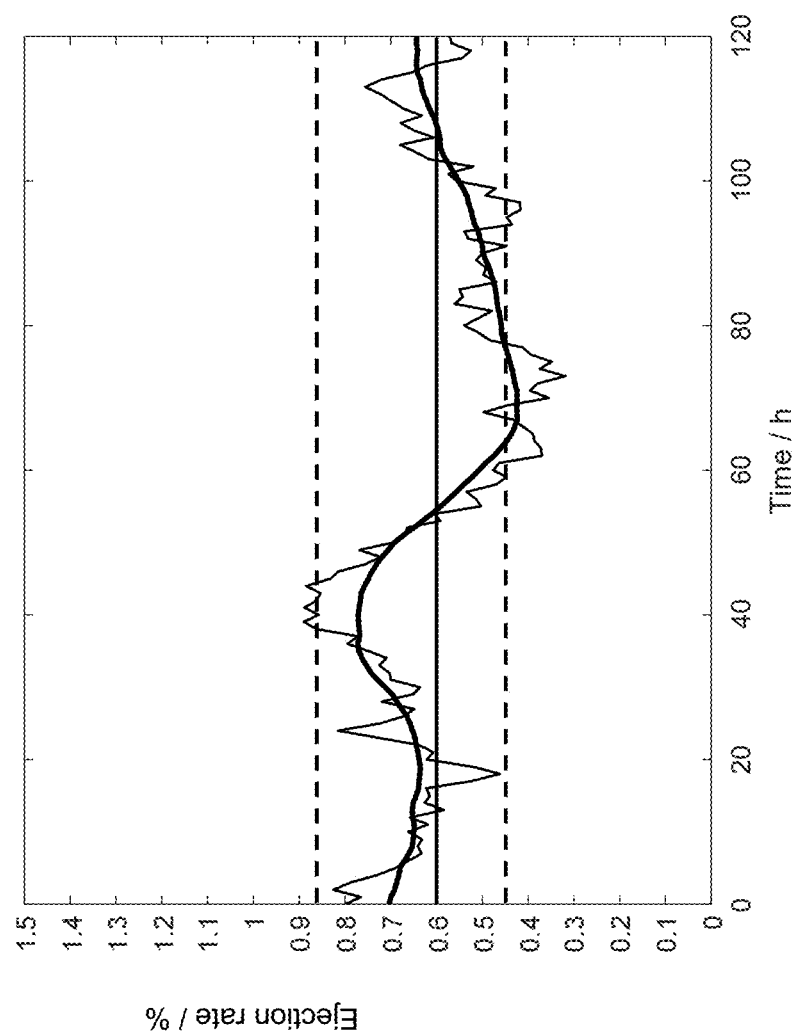
FIG. 6 is a graph showing the ejection rate as a function of time, as it may occur during operation of an X-ray inspection device according to FIG. 1, wherein a predetermined upper confidence limit is observed at least when considering a moving average value.

FIG. 6 shows a graph in which the reject rate (in the case of good process products) is shown in % as a function of time, i.e. the ratio of images in which an anomaly was detected divided by a fixed number (or within a fixed time span) of images (or products) examined in the immediate past. The graph shows the false positive rate of 0.6% used to determine the threshold in question, which was determined using good products or good process products, and the limits of the confidence interval, where the upper limit of the confidence interval is 0.85% and the lower limit is 0.45%. As can be seen from the graph, the ejection rate over a period of 120 hours essentially fluctuates within the confidence interval around the specified false positive rate. The smoother curve represents an ejection rate determined over 24 hours and the less smooth curve represents an ejection rate determined over one hour (each determined as a moving average).

Figure 7:
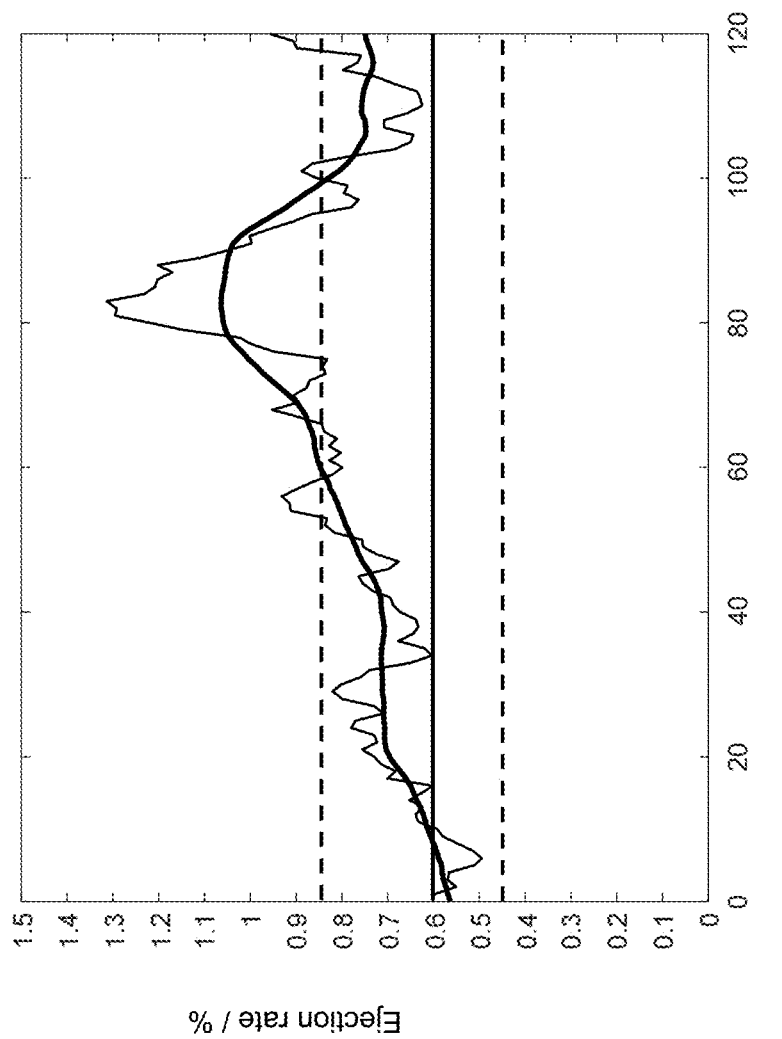
FIG. 7 is a graph similar to FIG. 6, where the upper confidence limit is exceeded.

FIG. 7 shows a graph analogous to FIG. 6, wherein even the smoother curve leaves the upper limit of the confidence interval for the false positive rate in a range between approx. 60 and 100 hours. However, it is not possible to determine from this curve whether these are correctly detected anomalies or false positives. However, the increase may independently indicate a problem or change in the process of manufacturing or processing the products that underlie the digital images examined.

Figure 8:
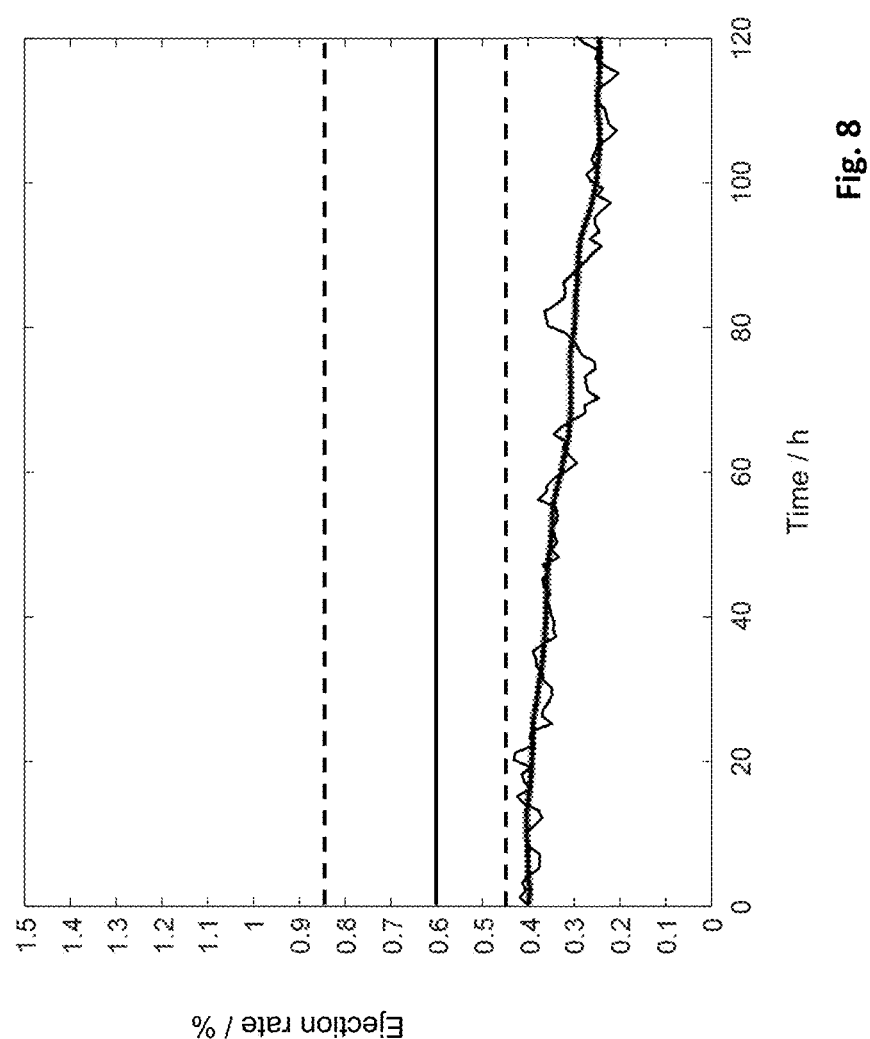
FIG. 8 is a graph similar to FIGS. 6 and 7, where the upper confidence limit is observed, and a lower confidence limit is still undershot.

FIG. 8 also shows a graph analogous to FIGS. 6 and 7, but both curves (ejection rate determined over one hour and 24 hours, respectively) are well below the given false positive rate, even well below the lower limit of the confidence interval in question. This information can be used to increase the predetermined false positive rate (when repeating the learning process) in favour of a better detection of actual anomalies, in other words, to make the detection method more sensitive.

This information could also be interpreted to mean that the production quality has improved in comparison to the time when it was learned. One could repeat the learning with an identical false positive rate and get a better sensitivity while at the same time maintaining (but no longer clearly falling short of) the specified false positive rate.

The invention thus provides methods for the detection of anomalies using a threshold value, wherein, for the determination of the threshold value, a rate can be specified at which a maximum or minimum anomaly is to be incorrectly detected in images to be examined, or a rate at which no maximum or minimum anomaly is to be correctly detected in images to be examined (case of threshold value determination using images of good products or good process products) or a rate at which a maximum or minimum anomaly is to be correctly detected in images to be examined, or a rate at which no maximum or minimum anomaly is to be incorrectly detected in images to be examined (case of threshold determination using images of bad products or bad process products).

The methods within the scope of the invention are suitable for detecting anomalies in images of products which can be generated in any way and which represent any characteristics of the products. In particular, the method is suitable for analysing images obtained by means of inspection devices that use X-rays or terahertz radiation and can thus generate information about the interior of a product. In particular, the method can be implemented by software in an inspection device. The result of the detection process can be used to control further devices, for example a sorting device.

The rate to be preset can be fixed (e.g. in the software) or preset by a user of the method or a device in which the method is implemented.

The same applies to the probability density function and the associated distribution function. In a corresponding software, several of these functions can also be integrated for selection by a user.

The respective rate can not only be specified for a specific machine or system, but also, for example, for several machines or systems. For example, it can be specified that a rate is to apply as a total rate for several similar (or also dissimilar) machines. The value of the rate specified for a machine or system can also be determined from a specification of the number of images/products detected in a time unit according to the specification, wherein the throughput (total number of images/products per time unit) must also be known.

This value of images/products detected per time unit according to the specification (e.g. number of false ejections per hour) can in turn result from practical conditions. For example, two people can be provided to check ejected products, rework them if necessary and then reintroduce them into the process downstream of the detection. If each of these processes (checking and, if necessary, reworking) takes five minutes, a maximum of 24 products may be detected and ejected per hour according to the relevant specification. At a throughput of e.g., 1200/h, the current ejection rate should therefore not exceed 2%. The specified false ejection rate must therefore never be greater than 2% so that inspection and reworking can take place without the products to be rein-spected and, if necessary, reworked piling up.

Furthermore, it is possible to compare the current ejection rate between two similar detection devices or systems that are fed from the same source. If the current ejection rates differ sig-nificantly, this indicates an error in the detection.

Finally, it should be mentioned that the two methods according to which the respective threshold values $X_{su}$ and/or $X_{so}$ or $Y_{su}$ and/or $Y_{so}$ are determined can also be applied simultane-ously, for example in order to check whether the rate specified in each case for determining the threshold values provides an acceptable threshold value.

Figure 9:
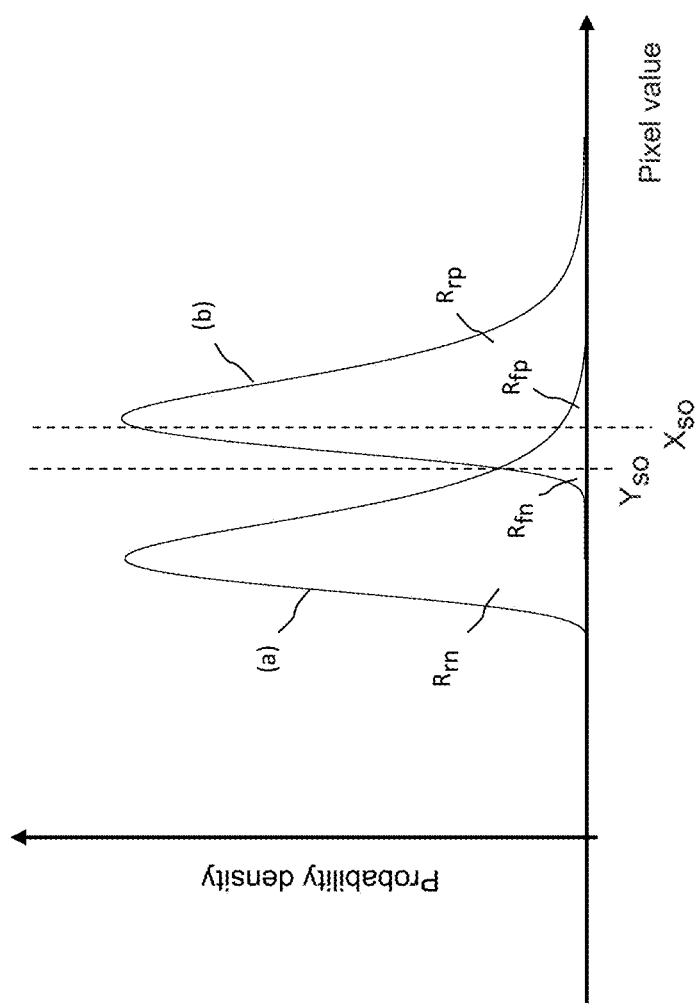
FIG. 9 is a graph showing a first probability density function (curve (a)) for maximum values of a property determined using digital images of good products (or good process products) and a second probability density function (curve (b)) for maximum values of a property determined using digital images of bad products (or bad process products) where the threshold value $X_{so}$ determined from curve (a) is greater than the threshold value $Y_{so}$ determined from curve (b).

One such verification method is explained below with reference to FIG. 9. FIG. 9 shows a curve (a) showing the probability density function for maximum values of a property determined using digital images of good products (or good process products) and a second probability density function (curve (b)) for maximum values of a property determined using digital images of bad products (or bad process products). From the probability density function defining curve (a), the relevant upper threshold value $X_{so}$ was determined using the associated false positive rate (which may also be referred to as the false reject rate) or also from the associated false negative rate. In addition, the upper threshold value $Y_{so}$ was determined from the probability density function defining curve (b) using the associated false negative rate (which can also be referred to as false detection rate) or also from the associated true positive rate.

Normally, the two threshold values $X_{so}$ and $Y_{so}$ will not be identical. If, as shown in FIG. 9, the threshold value $X_{so}$, which was determined from the predetermined false ejection rate, is greater than the threshold value $Y_{so}$, which was determined from the predetermined false detection rate, this would indicate a contradiction: For if the threshold value $X_{so}$ were used, the false detection rate resulting from curve (b) (i.e. the value of the integral over curve (b) from minus infinity to the threshold value $X_{so}$ would be greater than the specified value for the false detection rate. Con-versely, even when using threshold $Y_{so}$, the false ejection rate resulting from curve (a) (i.e. the value of the integral over curve (b) from minus infinity to threshold $X_{so}$) would be greater than the predetermined value for the false detection rate.

When considering the situation for the minimum anomalies, an analogous (but reversed) picture emerges: If the threshold value $X_{su}$ is smaller than the threshold value $Y_{su}$, this would mean that using the threshold value $X_{su}$ from the respective other probability density function would result in a false detection rate (i.e. a value of the integral over the probability density function for the minimum anomalies determined by means of bad products from $X_{su}$ to plus infinity) that is higher than the false detection rate specified for determining the threshold value $Y_{su}$. Similarly, if the threshold value $Y_{su}$ is used to calculate the false rejection rate, the false rejection rate resulting from the other probability density function for the bad products would be greater than the predetermined false rejection rate.

In such a contradictory case, it would ultimately have to be decided, taking into account economic conditions, whether the higher false detection rate (i.e. the probability with which a product with a maximum anomaly is not detected as a bad product) is of higher importance or the false rejection rate (i.e. the probability with which a good product is detected as a bad product). In response to such a contradiction, the relevant predefined rate, which is classified as less important, would then be changed in such a way that an associated threshold value results which is no longer classified as contradictory.

Figure 10:
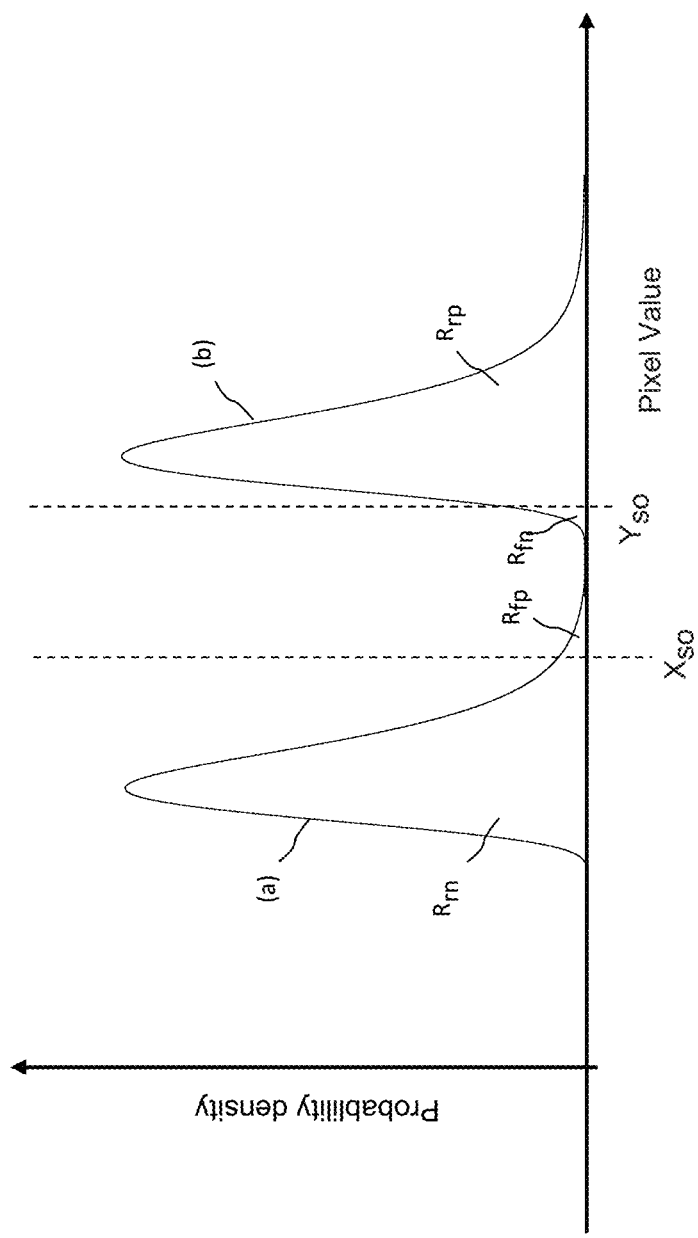
FIG. 10 is a graph analogous to FIG. 9, but with the threshold value $X_{so}$ determined from curve (a) being smaller than the threshold value $Y_{so}$ determined from curve (b).

FIG. 10 shows a situation where no such contradiction occurs. The threshold value $X_{so}$ is smaller than the threshold value $Y_{so}$, so that the two given rates can be fulfilled at the same time, since the false ejection rate and the false detection rate are upper limits respectively. In other words, in this case, if the threshold value calculated by the respective probability density function using the respective rate is used to calculate the respective other rate from the respective other probability density function, the rate thus determined would be found to be less than or equal to the rate specified for determining the respective other probability density function and thus within an acceptable range.

In such a case, one or both of the preset rates can be varied so that the resulting threshold values are closer together or, in extreme cases, even identical.

As used herein, whether in the above description or the following claims, the terms "comprising," "including," "carrying," "having," "containing," "involving," and the like are to be understood to be open-ended, that is, to mean including but not limited to. Also, it should be understood that the terms "about," "substantially," and like terms used herein when referring to a dimension or characteristic of a component indicate that the described dimension/characteristic is not a strict boundary or parameter and does not exclude variations therefrom that are functionally similar. At a minimum, such references that include a numerical parameter would include variations that, using mathematical and industrial principles accepted in the art (e.g., rounding, meas-urement or other systematic errors, manufacturing tolerances, etc.), would not vary the least sig-nificant digit.

Any use of ordinal terms such as "first," "second," "third," etc., in the following claims to modify a claim element does not by itself connote any priority, precedence, or order of one claim element over another, or the temporal order in which acts of a method are performed. Rather, unless specifically stated otherwise, such ordinal terms are used merely as labels to distinguish one claim element having a certain name from another element having a same name (but for use of the ordinal term). Rather than using an ordinal term to distinguish between commonly named elements, a particular one of a number of elements may be called out in the following claims as a "respective one" of the elements and thereafter referred to as "that respective one" of the elements.

The term "each" may be used in the following claims for convenience in describing characteristics or features of multiple elements, and any such use of the term "each" is in the inclu-sive sense unless specifically stated otherwise. For example, if a claim defines two or more elements as "each" having a characteristic or feature, the use of the term "each" is not intended to exclude from the claim scope a situation having a third one of the elements which does not have the defined characteristic or feature.

The above-described preferred embodiments are intended to illustrate the principles of the invention, but not to limit the scope of the invention. Various other embodiments and modifica-tions to these preferred embodiments may be made by those skilled in the art without departing from the scope of the present invention. For example, in some instances, one or more features disclosed in connection with one embodiment can be used alone or in combination with one or more features of one or more other embodiments. More generally, the various features described herein may be used in any working combination.

REFERENCE LIST

100 X-ray inspection device
102 Anomaly detection device
104 Product
Conveyor
108 Conveyor belt
110 Conveyor belt
112 Conveyor belt
114 Conveyor belt
Shielding enclosure
118 X-ray source
120 X-ray detector
121 X-ray beam
122 Image processing unit
124 Display unit
F Conveying direction
$X_{su}$ Lower threshold value (determination of the threshold value by means of good products or good process products)
$Y_{su}$ Lower threshold value (determination of the threshold value by means of bad products or bad process products)
$X_{so}$ Upper threshold value (determination of the threshold value by means of good products or good process products)
$Y_{so}$ Upper threshold (determination of the threshold value by means of bad products or bad process products)
$\Delta X_{so}$ Width of the confidence interval for the maximum threshold value
$\Delta X_{su}$ Width of the confidence interval for the minimum threshold value
$R_{fp}$ False positive rate
$R_{rn}$ True negative rate
$R_{rp}$ True positive rate
$R_{fn}$ False negative rate

The invention claimed is:

1. A method of detecting anomalies in digital images of products, each digital image being formed by a plurality of pixels, each pixel representing an associated location within the respective digital image and having a value character-ising the associated location, each digital image defining one or more regions with each region including one pixel or multiple adjacent pixels, and wherein for each region a region value is determined, the region value comprising a value for at least one property of the respective region or a combined value for multiple properties of the respective region, the method comprising:

(a) one or both of (i) detecting a respective region defined by a respective one of the digital images as a maximum anomaly when the region value of the respective region is greater than a predetermined maximum threshold value or a secondary maximum threshold value derived from the predetermined maximum threshold value and (ii) detecting the respective region defined by a respective one of the digital images as a minimum anomaly when the region value is less than a predetermined minimum threshold value or a secondary minimum threshold value derived from the predetermined minimum threshold value; and (b) wherein the predetermined maximum threshold value and the predetermined minimum threshold value are determined by, (i) for each of a number of learning digital images of good products or of good process products, specifying the one or more regions and determining the respective region value of each region and determining the maximum value of these respective region values as the maximum sample value of a maximum value sample or determining the minimum value of these respective region values as the minimum sample value of a minimum value sample; and (ii) using a statistical estimation method, determining estimates for all free, non-specified parameters of a probability density function specified to describe the maximum value sample using the maximum sample values or determining estimates for all free, non-specified parameters of a probability density function specified to describe the minimum value sample using the minimum sample values; and (iii) (I) setting a first rate at which a maximum anomaly is incorrectly detected in images to be examined or a second rate at which a maximum anomaly is correctly not detected in images to be examined, or (II) setting a third rate at which a minimum anomaly is incorrectly detected in images to be examined or a fourth rate at which a minimum anomaly is correctly not detected in an image to be examined; and one or both of, (A) determining the maximum threshold value using the probability density function parameterised according to (b) (ii) or a distribution function corresponding thereto such that the probability of occurrence of a maximum value greater than or equal to the maximum threshold value corresponds to the first rate or such that the probability of occurrence of a maximum value less than or equal to the maximum threshold value corresponds to the second rate, and (B) determining the minimum threshold value using the probability density function parameterised in accordance with (b)(ii) or a distribution function corresponding thereto such that the probability of occurrence of a minimum value less than or equal to the minimum threshold value is equal to the third rate or such that the probability of occurrence of a minimum value greater than or equal to the minimum threshold value is equal to the fourth rate.

2. The method according to claim 1 wherein one of:

(a) the one or more regions are determined using a base threshold value, wherein each isolated pixel and each group of adjacent pixels whose pixel value is greater than the base threshold value are each assigned to a region of a first group of regions, or wherein each isolated pixel and each group of adjacent pixels whose pixel value is less than or equal to the base threshold value are each assigned to a region of a second group of regions, and (b) the one or more regions are defined using a geometric mask, in particular a fixed mask or a mask generated from the respective image by means of image processing.

3. The method according to claim 1 wherein a geometric property determined from location information of the pixels of a respective region, in particular the area, the circumference or the diameter, or a pixel value property determined from the values of the pixels of the respective region is used as a property of the respective region, wherein the pixel value property comprises one of the maximum value, the minimum value, the mean value, or the variance or standard deviation of all pixels of the region.

4. The method according to claim 1 wherein the number of learning digital images of good products, good process products, bad products, or bad process products is determined using at least one termination criterion, a current number of learning digital images being increased until the at least one termination criterion is fulfilled.

5. The method according to claim 4 wherein the at least one termination criterion is formed by or derived from a confidence interval for at least one parameter of the respective probability density function.

6. The method according to claim 4 wherein the at least one termination criterion is formed by a threshold confidence interval for the minimum threshold value or the maximum threshold value, the threshold confidence interval being determined by determining a confidence interval for each parameter and determining an effect of these confidence intervals on the threshold confidence interval using the method of Gaussian error propagation.

7. The method according to claim 4 wherein the at least one termination criterion is formed by a threshold confidence interval for the minimum threshold value or maximum threshold value, the threshold confidence interval being determined by means of a statistical method comprising the bootstrapping method.

8. The method according to claim 1 wherein using the respective probability density function and the respective parameters, for each detected maximum sample value or minimum sample value the probability is determined with which values occur that are smaller than or equal to the respective detected maximum sample value or minimum sample value, and the probability with which values occur that are larger than or equal to the respective detected maximum sample value or minimum sample value, and in that the parameters for the probability density function are redetermined if, for at least one of the detected maximum sample values or minimum sample values, one of the two respective probabilities determined in this way is smaller than a predetermined outlier limit, these maximum sample values or minimum sample values remaining unconsidered in the redetermination.

9. The method according to claim 1 wherein a statistical test is carried out which provides a statement as to whether the respective predetermined probability density function, using the estimated values for the parameters determined for this purpose, describes the empirical distribution in the form of the respective detected maximum sample values or minimum sample values sufficiently accurately.

10. The method according to claim 9 wherein the estimation of the parameters, after detecting a predetermined minimum number of maximum sample values or minimum sample values, is carried out for a plurality of predetermined different probability density functions, in that for each of the thus determined probability density functions the statistical test is carried out and in that for the further method that probability density function is used as predetermined probability density function for which the statistical test gives the most appropriate result.

11. The method according to claim 6 wherein a confidence interval or an error limit for the respective predetermined rate is determined from the limits of the confidence interval for the maximum threshold value or the minimum threshold value.

12. The method according to claim 11 wherein the confidence interval or the error limit for the respective predetermined rate are output for monitoring or controlling devices or an entire production line used for manufacturing, processing or testing the products.

13. The method according to claim 1 wherein a secondary maximum threshold is determined, the secondary maximum threshold being selected within the limits of a confidence interval determined for the maximum threshold or equal to a limit of the confidence interval, or the secondary minimum threshold being selected within the limits of a confidence interval determined for the minimum threshold or equal to a limit of the confidence interval.

14. The method according to claim 1 wherein the predetermined probability distribution is the generalised extreme value distribution comprising the Gumbel distribution, the Weibull distribution, or the Fréchet distribution.

15. An apparatus for detecting anomalies in digital images of products, comprising data processing means adapted to obtain and process digital image data of digital images of products, wherein that the data processing means is adapted to carry out the method according to claim 1.

16. A computer program product for detecting anomalies in digital images of products, the computer program product comprising non-transitory computer readable media storing instructions which, when executed by a data processing device, cause the device to perform the method of claim 1.

17. A method of detecting anomalies in digital images of products, each digital image being formed by a plurality of pixels, each pixel representing an associated location within the respective digital image and having a value characterising the associated location, each digital image defining one or more regions with each region including one pixel or multiple adjacent pixels, and wherein for each region a region value is determined, the region value comprising a value for at least one property of the respective region or a combined value for multiple properties of the respective region, the method comprising:
(a) one or both of (i) detecting a respective region defined by a respective one of the digital images as a maximum anomaly when the region value of the respective region is greater than a predetermined maximum threshold value or a secondary maximum threshold value derived from the predetermined maximum threshold value and (ii) detecting the respective region defined by a respective one of the digital images as a minimum anomaly when the region value is less than a predetermined minimum threshold value or a secondary minimum threshold value derived from the predetermined minimum threshold value; and
(b) wherein the predetermined maximum threshold value and the predetermined minimum threshold value are determined by,
(i) for each of a number of learning digital images of bad products or of bad process products, specifying the one or more regions and determining the respective region value of each region and determining the maximum value of these respective region values as the maximum sample value of a maximum value sample or determining the minimum value of these respective region values as the minimum sample value of a minimum value sample; and
(ii) using a statistical estimation method, determining estimates for all free, non-specified parameters of a probability density function specified to describe the maximum value sample using the maximum sample values and/or determining estimates for all free, non-specified parameters of a probability density function specified to describe the minimum value sample using the minimum sample values; and
(iii) (I) setting a first rate at which a maximum anomaly is correctly detected in images to be examined or a second rate at which no maximum anomaly is incorrectly detected in images to be examined, or (II) setting a third rate at which a minimum anomaly is correctly detected in images to be examined or a fourth rate at which no minimum anomaly is incorrectly detected in images to be examined; and
one or both of,
(A) determining the maximum threshold value using the probability density function parameterised according to (b)(ii) or a distribution function corresponding thereto such that the probability of occurrence of a maximum value less than or equal to the maximum threshold value corresponds to the second rate or such that the probability of occurrence of a maximum value greater than or equal to the maximum threshold value corresponds to the first rate, and (B) determining the minimum threshold value using the probability density function parameterised in accordance with (b)(ii) or a distribution function corresponding thereto such that the probability of occurrence of a minimum value greater than or equal to the minimum threshold value is equal to the fourth rate or such that the probability of occurrence of a minimum value less than or equal to the minimum threshold value is equal to the third rate.

18. The method according to claim 17 wherein one of:
(a) the one or more regions are determined using a base threshold value, wherein each isolated pixel and each group of adjacent pixels whose pixel value is greater than the base threshold value are each assigned to a region of a first group of regions, or wherein each isolated pixel and each group of adjacent pixels whose pixel value is less than or equal to the base threshold value are each assigned to a region of a second group of regions, and
(b) the one or more regions are defined using a geometric mask, in particular a fixed mask or a mask generated from the respective image by means of image processing.

19. The method according to claim 17 wherein a geometric property determined from location information of the pixels of a respective region, in particular the area, the circumference or the diameter, or a pixel value property determined from the values of the pixels of the respective region is used as a property of the respective region, wherein the pixel value property comprises one of the maximum value, the minimum value, the mean value, or the variance or standard deviation of all pixels of the region.

20. The method according to claim 17 wherein the number of learning digital images of good products, good process products, bad products, or bad process products is determined using at least one termination criterion, a current number of learning digital images being increased until the at least one termination criterion is fulfilled.

21. The method according to claim 20 wherein the at least one termination criterion is formed by or derived from a confidence interval for at least one parameter of the respective probability density function.

22. The method according to claim 20 wherein the at least one termination criterion is formed by a threshold confidence interval for the minimum threshold value or the maximum threshold value, the threshold confidence interval being determined by determining a confidence interval for each parameter and determining the effect of these confidence intervals on the threshold confidence interval using the method of Gaussian error propagation.

23. The method according to claim 20 wherein the at least one termination criterion is formed by a threshold confidence interval for the minimum threshold value or maximum threshold value, the threshold confidence interval being determined by means of a statistical method comprising the bootstrapping method.

24. The method according to claim 17 wherein using the respective probability density function and the respective parameters, for each detected maximum sample value or minimum sample value the probability is determined with which values occur that are smaller than or equal to the respective detected maximum sample value or minimum sample value, and the probability with which values occur that are larger than or equal to the respective detected maximum sample value or minimum sample value, and in that the parameters for the probability density function are redetermined if, for at least one of the detected maximum sample values or minimum sample values, one of the two respective probabilities determined in this way is smaller than a predetermined outlier limit, these maximum sample values or minimum sample values remaining unconsidered in the redetermination.

25. The method according to claim 17 wherein a statistical test is carried out which provides a statement as to whether the respective predetermined probability density function, using the estimated values for the parameters determined for this purpose, describes the empirical distribution in the form of the respective detected maximum sample values or minimum sample values sufficiently accurately.

26. The method according to claim 25 wherein the estimation of the parameters, after detecting a predetermined minimum number of maximum sample values or minimum sample values, is carried out for a plurality of predetermined different probability density functions, in that for each of the thus determined probability density functions the statistical test is carried out and in that for the further method that probability density function is used as predetermined probability density function for which the statistical test gives the most appropriate result.

27. The method according to claim 21 wherein a confidence interval or an error limit for the respective predetermined rate is determined from the limits of the confidence interval for the maximum threshold value or the minimum threshold value.

28. The method according to claim 27 wherein the confidence interval or the error limit for the respective predetermined rate are output for monitoring or controlling devices or an entire production line used for manufacturing, processing or testing the products.

29. The method according to claim 17 wherein a secondary maximum threshold is determined, the secondary maximum threshold being selected within the limits of a confidence interval determined for the maximum threshold or equal to a limit of the confidence interval, or the secondary minimum threshold being selected within the limits of a confidence interval determined for the minimum threshold or equal to a limit of the confidence interval.

30. The method according to claim 17 wherein the predetermined probability distribution is the generalised extreme value distribution comprising the Gumbel distribution, the Weibull distribution, or the Fréchet distribution.

31. An apparatus for detecting anomalies in digital images of products, comprising data processing means adapted to obtain and process digital image data of digital images of products, wherein that the data processing means is adapted to carry out the method according to claim 17.

32. A computer program product for detecting anomalies in digital images of products, the computer program product comprising non-transitory computer readable media storing instructions which, when executed by a data processing device, cause the device to perform the method of claim 17.

* * * * *